July 21, 1936. J. B. SPERRY 2,048,640
ACTIVATED SLUDGE SYSTEM AND APPARATUS FOR SEWAGE TREATMENT
Filed Feb. 28, 1931 5 Sheets-Sheet 1

Inventor:
John B. Sperry

July 21, 1936. J. B. SPERRY 2,048,640
ACTIVATED SLUDGE SYSTEM AND APPARATUS FOR SEWAGE TREATMENT
Filed Feb. 28, 1931 5 Sheets-Sheet 4

Witness:
William P. Kilroy

Inventor:
John B. Sperry

July 21, 1936. J. B. SPERRY 2,048,640
ACTIVATED SLUDGE SYSTEM AND APPARATUS FOR SEWAGE TREATMENT
Filed Feb. 28, 1931 5 Sheets—Sheet 5

Witness:
William P. Kilroy

Inventor:
John B. Sperry

Patented July 21, 1936

2,048,640

UNITED STATES PATENT OFFICE 2,048,640

ACTIVATED SLUDGE SYSTEM AND APPARATUS FOR SEWAGE TREATMENT

John B. Sperry, Aurora, Ill., assignor to The American Well Works, Aurora, Ill., a corporation of Illinois Application February 28, 1931, Serial No. 519,106

35 Claims. (Cl. 210—8)

This invention relates to sewage treatment in general and it is one of the objects of the present invention to provide an improved sewage digesting system of the activated sludge type.

In the activated sludge system for sewage disposal it has been known that the absorption of air or oxygen by the liquor will facilitate the clarification of the liquor. Much of the finely divided material of sewage originally consisted of animal or vegetable tissues which, through putrification or other chemical changes, have broken down into very small particles which will not settle out of the liquor within a reasonable length of time unless these small particles are caused to combine with other particles to produce particles of increased size. In the presence of oxygen these small particles tend to unite with one another or with other particles present at a much more rapid rate than in the absence of a sufficient supply of oxygen, and various means have been heretofore devised for bubbling air or oxygen through the aeration tanks to maintain the reaction for sludge building at its maximum. It is one of the objects of the present invention to provide an improved aerating means for use in a sewage disposing means.

I have found that by simple mechanical mixing, a rapid absorption of oxygen takes place and sewage can be clarified by such mechanical devices without the use of compressed air. Early observations by various investigators have shown that a comparatively small proportion of the air introduced into sewage through porous plates, usually used, was actually taken up by the liquor. The reason for this appears to be that air bubbles in arising to the surface of a liquid, carry with them a thin film of the liquid and it is only this film which becomes saturated with the air. Mechanical agitation results in the continual breaking up of such saturated forms and the formation of new surfaces which in turn are quickly saturated by the gas to be dissolved.

It is one of the objects of the present invention to devise an efficient mechanical agitation device which will meet the following conditions:

1. Maximum exposure of liquid surface to the oxygen,
2. Complete mixture of liquid after exposure of liquid surface to the atmosphere.
3. Low power consumption.
4. Simple attention for proper operation after once adjusted for local conditions.
5. Provided with means to adjust the device to wide range of conditions.
6. Convenient provision for examination of working parts.

It is a further object of the present invention to provide an improved system of treating sewage by the activated sludge process wherein the flow of the return sludge is brought about automatically and wherein this flow is over a different course from that of the systems heretofore used.

The attainment of the above and further objects of the present invention will be apparent from the following specification taken in conjunction with the accompanying drawings forming a part thereof.

In the drawings:

Figures 1A and 1B, when arranged with Figure 1B to the right of Figure 1A with the lines a—a coinciding, constitute a plan view of a sewage aerating system arranged in accordance with my invention;

Figures 2A and 2B, when arranged with Figure 2B to the right of Figure 2A with the lines b—b of the two figures coinciding, constitute a vertical section of the apparatus shown in Figures 1A and 1B, said section being taken along the line 2—2 of Figures 1A and 1B;

Figure 1:
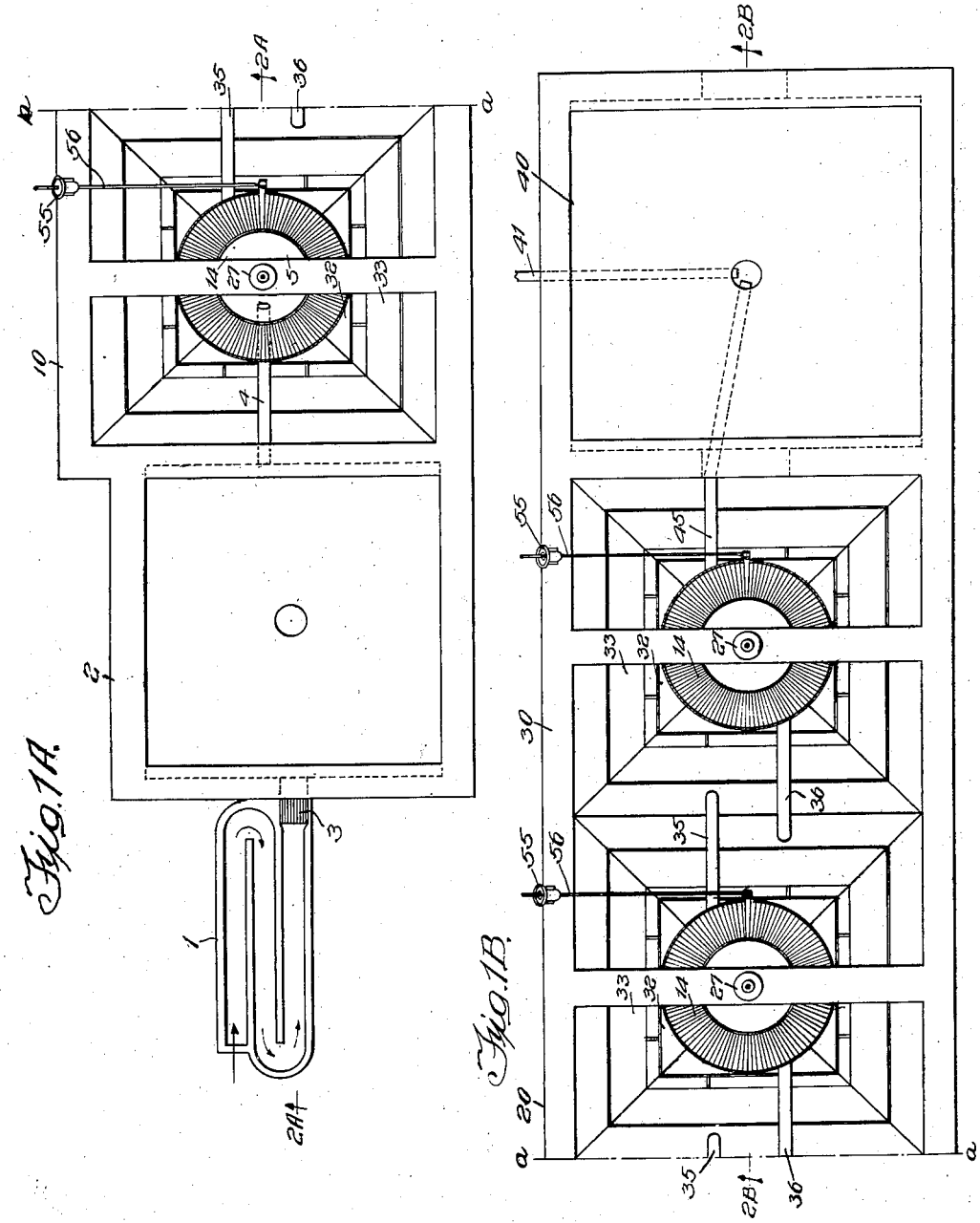
Figure 2:
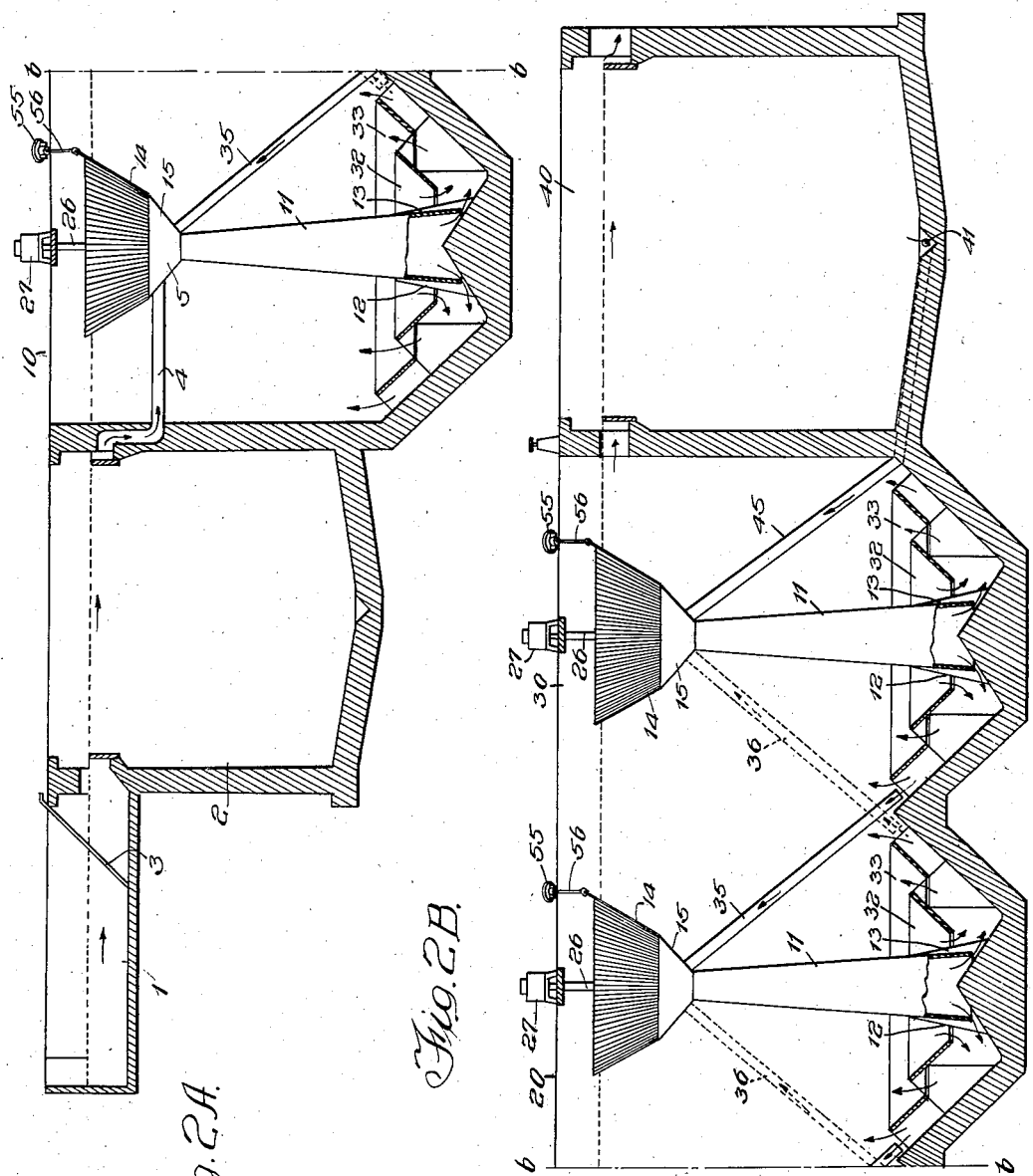

An explanation will now be given of the construction and mode of operation of my sewage treating plant. The apparatus shown in Figures 1 and 2 comprises a grit chamber 1, a preliminary settling tank 2, an aerator comprising three aeration units 10, 20, and 30, and a final settling tank 40. Both the preliminary settling tank 2 and the final settling tank 40 are of constructions well known in the art and have clarifying devices that are not shown as they do not form any part of this invention. Further, while I have shown the aeration tank as having three units indicated at 10, 20, and 30, the invention is not limited to this number, it being understood that there may be more or less than three units as may be desired in any particular installation. The aeration units constitute the successive stages in the treatment of the sewage and will be referred to as such in the following description.

The influent enters the grit chamber 1 and passes through a screen 3, which separates out the coarser particles, into the preliminary settling tank 2. From the preliminary settling tank the influent passes through a conduit 4 into the mixing cone 5 of the first aeration unit 10. The general flow through the aeration tank is longitudinal and with a velocity depending upon the retention period necessary to properly treat the fluid, which may vary from four to twelve hours. From the aeration tank the flow passes through the final settling tank 40 where the sludge is settled out and the clear effluent is discharged into the river or any available water course, while the excess sludge is discharged into a sludge digester through a pipe 41. The sludge digestion chamber may be of any preferred type and, per se, forms no part of the present invention.

Figure 3:
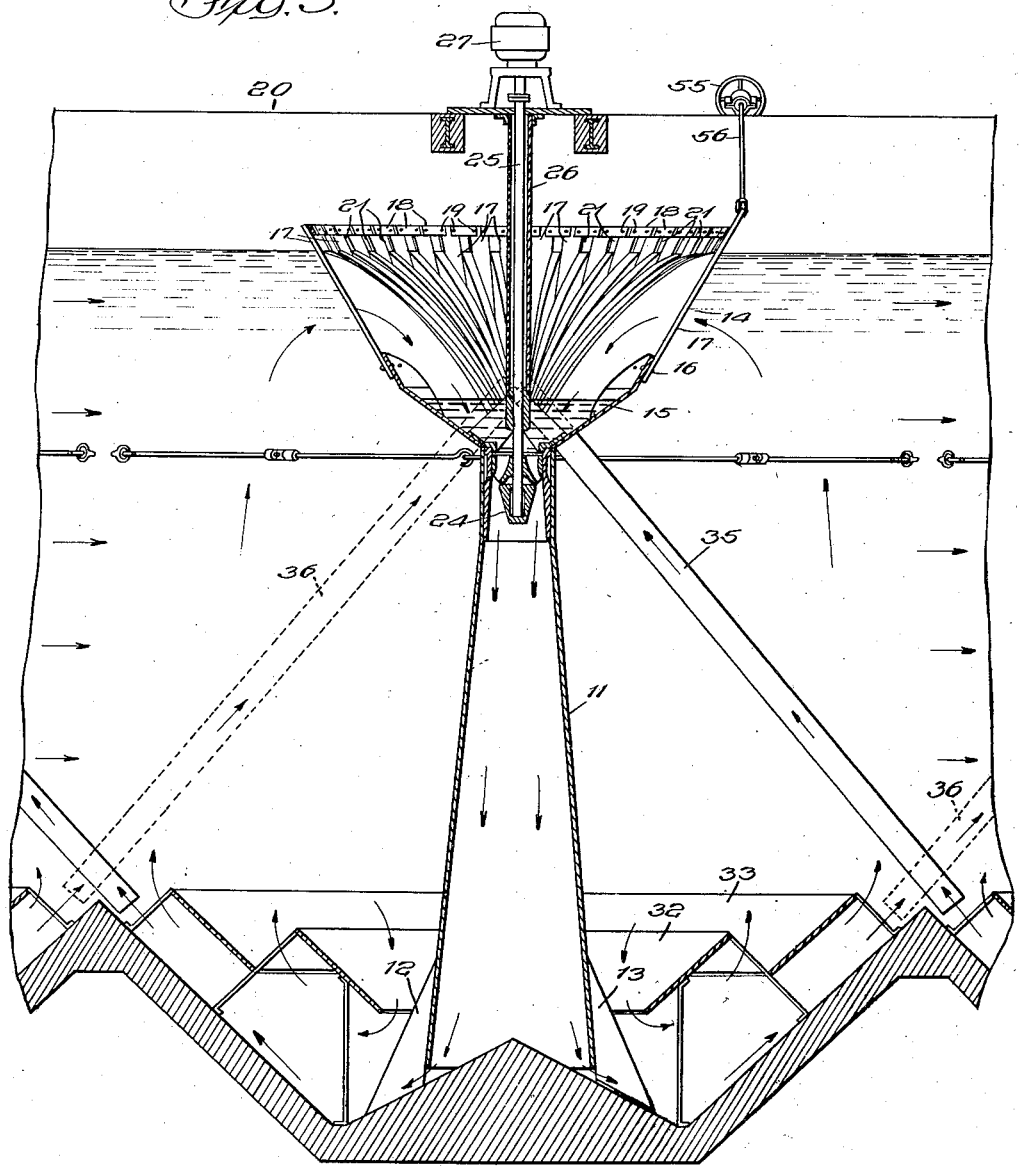
Figure 3 is an enlarged sectional view of one of the aerating units.
Figure 4:
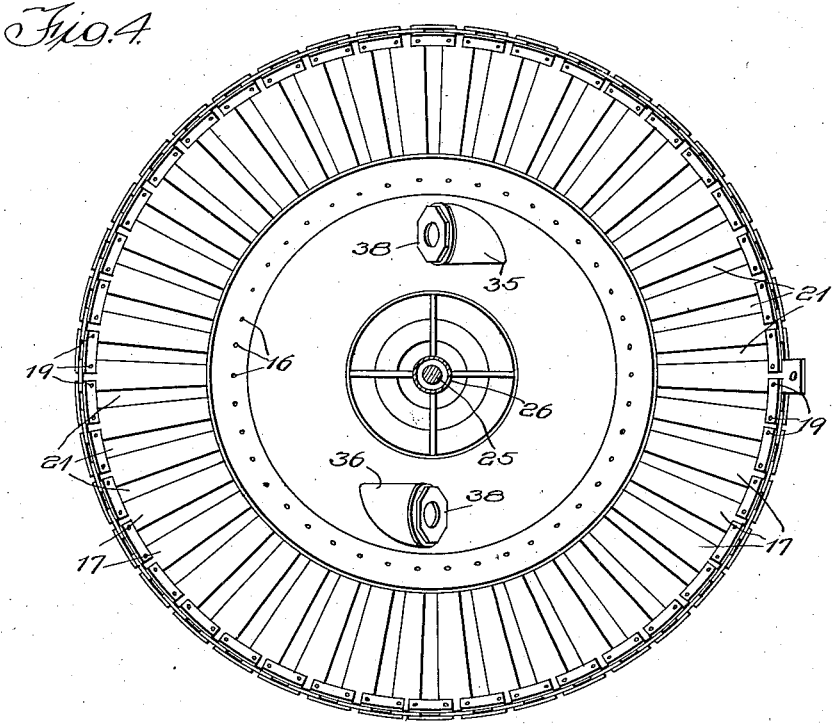
Figure 4 is an enlarged top view of the aerating cone of Figure 3.
Figure 5:
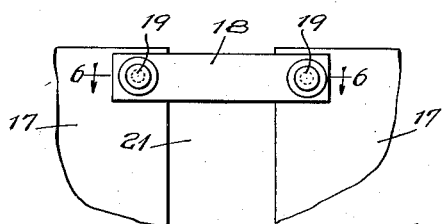
Figure 5 is a view showing the manner whereby the strips constituting the mixing cone are secured together.
Figure 6:
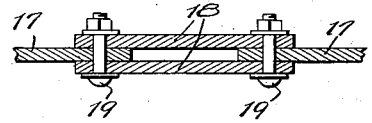
Figure 6 is a fragmentary sectional view taken along the line 6—6 of Figure 5.
Figure 7:
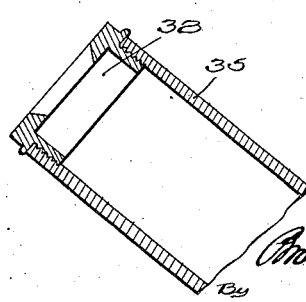
Figure 7 is a sectional view of the top portion of the automatic sludge return tube.

The three aeration stages 10, 20, and 30 are of identical construction and a description of one is applicable to the others. In Figure 3 there is shown an enlarged view of one of the aeration stages. A downflow tube 11 is suitably supported at the bottom of the aeration tank as by means of brace members 12 and 13 which suitably space the bottom of the downflow tube from the bottom of the tank so as to permit the flow of liquor from the tube downward into the tank. The downflow tube is suitably braced adjacent the top thereof and supports a mixing cone 14. This mixing cone comprises an inverted conical member 15 which rests upon the downflow tube 11 and has a number of slats 17 pivoted thereto as at 16 in spaced relationship. These slats comprise merely narrow strips of metal. At their upper ends the adjacent metal strips 17 are secured together by links 18—18 and bolts or pins 19—19. The strips 17 together with the cone portion 15 form a conical bowl which constitutes the mixing cone. As previously stated, the strips 17—17 are spaced apart to provide slots 21. These slots permit the flow of liquid into the mixing cone.

A low head vertical centrifugal or screw pump 24 is suspended in the throat of the downflow tube 11 by means of a shaft 25 within a sleeve 26, said shaft directly coupling the pump to an electric motor 27. The pump and motor may be readily withdrawn from the downflow tube for inspection or repair purposes without disturbing the mixing cone or the apparatus therein.

When the centrifugal pump 24 is in operation it causes the surface liquor in the tank to flow through the slots 21 of the mixing cone and thence downward through the downflow tube 11 to the bottom of the tank. Baffle plates 32 and 33 are provided for deflecting and evenly distributing the flow from the bottom of the tube 11 upwardly so that as the flow comes to the top the surface of the liquid in the tank will be in an effervescent condition very much similar to the surface of a glass of root beer recently drawn.

An automatic sludge return tube 35 extends from the bottom of each stage aerator to the mixing cone of the preceding stage, while a compensating flow and bulking control tube 36 extends from the bottom of each stage aerator to the mixing cone of the following stage. The purpose of these tubes will be fully set forth as this description proceeds.

Investigators have shown that the surface of the liquid in a sewage treating plant such as is here contemplated becomes saturated with oxygen in an infinitesimally short time on exposure to the atmosphere. It is the purpose of the mixing cones to saturate with oxygen as much liquid as possible within a minimum amount of time. The mixing cones are each provided with a large number of narrow slots 21 as has been previously described. The area of the slots in each cone is such that with the motor 27 operating at its normal speed the liquid flowing through the slots will have a considerable velocity. The pump maintains the level of the liquid within the mixing cone lower than that of the liquid on the outside of the cone and the liquid from the outside of the cone will therefore flow through the narrow slots 21 to the center of the mixing cone. The liquid necessarily flows in the form of narrow sheets within the mixing cone, which formation results from the narrow slots 21. The surface area of the liquid exposed to contact with the air is therefore very great compared with the sectional area of the liquid flowing through the slots. The surface area of these thin sheets of water becomes saturated with oxygen almost immediately and it is therefore apparent that the mixing cone is constantly creating a large number of thin layers of liquid saturated with oxygen. The flowing sheets of water move from the periphery of the mixing cone toward the center thereof and fall in the center in a confused and turbulent mass or mixture. As these sheets of water reach the center of the cone they strike each other and thoroughly mix the oxygen saturated layers or films of water together with fine bubbles of air, which are drawn down into the circulating pump and forced down the downflow tube 11 and out through the small slot at the bottom of the downflow tube. The area of the space between the bottom of the downflow tube 11 and the bottom of the tank is preferably such that the velocity of flow will never be less than about 1½ feet per second. This velocity will provide a layer of liquid sweeping in all directions from the center of the circulator unit and will prevent the settling of the sludge in the bottom of the tank. This moving layer of water will act as a carrier of the water above it and keep it in motion. The upward flow of the liquid through the tank causes the surface liquid to be in an effervescent condition, as previously stated. The function of the baffles 32 and 33 is to distribute the effervescent condition evenly over the surface of the liquid in the aerating tank so that the air entrained by the falling water will have a chance to give up its oxygen by contact as thoroughly as possible and prevent any septic action taking place.

Thus it will be seen that as the main body of liquid moves longitudinally through the aeration tank there is a down and up circulation through the tank at a comparatively rapid rate. By changing the width of the slots 21 in the mixing cone various rates of circulation may be had due to the raising or lowering of the head against which the circulating pump will work. Also the mean hydraulic radius of the falling sheets of water will be changed and thus the rate of oxygen absorption can be controlled to meet different local conditions.

The sludge return is brought about by means of the tubes 35. As the sludge is thickest in the lower zones of the tank each tube 35 connects the mixing cone of one stage with the lower zone of the tank within the working range of the next preceding circulator. The top end of the tube 35 extends within the mixing cone and since the level of the liquid within the mixing cone is lower than that outside of the cone there is a difference in water level on the two ends of the tube 35, which difference in water level causes a flow of sludge through the tube and into the mixing cone. The outlet of the tube 35 is provided with an orifice cap 38. This cap 38 may be replaced by one having a larger or a smaller opening, thereby changing the quantity of flow through the tube to fit the local conditions to get the proper amount of sludge return. Each circulator or aeration unit, except the last, receives return sludge from the following aeration unit. The last stage aerating unit 30 receives its return sludge from the final settling tank 40 by means of a sludge return tube 45 which extends from the bottom of the final settling tank 40 to the mixing cone of the aerating unit.

It is to be noted that the method of sludge return herein shown is automatic after it has once been adjusted for the sewage being treated. It is also possible to vary the amount of sludge return to the different stages so that the most efficient combination is secured. It is also to be noted that no pumps or the like are needed to force the sludge to flow through the sludge return tubes since this flow is brought about by the difference in water level at the two ends of the sludge return tube.

It has been found that bulking is a very serious difficulty in the operation of activated sludge plants of the type heretofore used. Young vegetative filaments probably of bacillus subtilis form compact rapidly settling flocs. As the cultures grow and the food supply becomes less abundant, spore formation sets in, the filaments are weakened at various points and begin to break up, with the result of the formation of the feathery non-settling flocs, known as "bulked" sludge. This bulking is caused by overripeness, but can be corrected by adding to the food supply.

In the apparatus herein shown there is provided means to furnish the additional food supply necessary to prevent bulking. The tubes 36, similar in construction to the tubes 35, accomplish this end. These tubes supply the circulator of each aerating stage with sludge drawn from the lower zone of the preceding circulator. The outlet of these tubes 36 is provided with a removable cap having an orifice therein and corresponding to the cap 38 of the tubes 35. These caps can be removed and replaced by a cap having an orifice of a different size. This control of bulking promotes better settling and therefore better and safer effluent throughout the plant. The tubes 36 also balance or compensate the flow of returned sludge flowing through the tubes 35 with the result that there is a generally balanced condition prevailing at the base of the circulators. Each of the tubes 36 is therefore a compensating flow and bulking control tube. No such tube is provided for the mixing cone of the first stage aeration unit 10 and instead this cone is supplied with liquid directly from the preliminary settling tank 2.

It has been previously stated that the size of the slots 21 in the mixing cone may be adjusted. As previously stated, each strip 17 of the mixing cone is pivoted at its lower end to the portion 15 of the cone. At their upper end these strips are connected together by links 18 that are pivoted to adjacent strips by the pins or bolts 19. The location of the bolts or pins 16 is such that the spacing between two adjacent bolts or pins is alike throughout. Likewise, the spacing between the two pins 19—19 is the same throughout the entire periphery of the mixing cone. The spacing between two pins 19 of each link is made equal to the spacing between two adjacent pins 16. Consider that the lower ends of the strips 17 are pivoted about a fixed pivot, any shifting of the upper end of the strips will narrow the slots 21 between adjacent strips and thereby narrow the thickness of the sheets of inflowing water. If the top portion of the mixing cone is shifted circumferentially about its center, the portion 15 of the mixing cone remaining stationary, then the slots 21 will be narrowed. The means for bringing about this adjustment comprises a rotatable wheel member 55 through which a tie rod 56 is screw threaded. Upon turning the wheel 55 the rod 56 will be pushed forward or pulled back, depending upon the direction of rotation of the hand wheel. One of the strips 17 is extended beyond the rim of the mixing cone and is pivotally connected to the end of the rod 56 so that upon movement of the rod a motion is imparted to the outer rim of the mixing cone. It is to be understood that the total amount of movement that may be imparted to the periphery of the mixing cone is but a few degrees.

Figure 8:
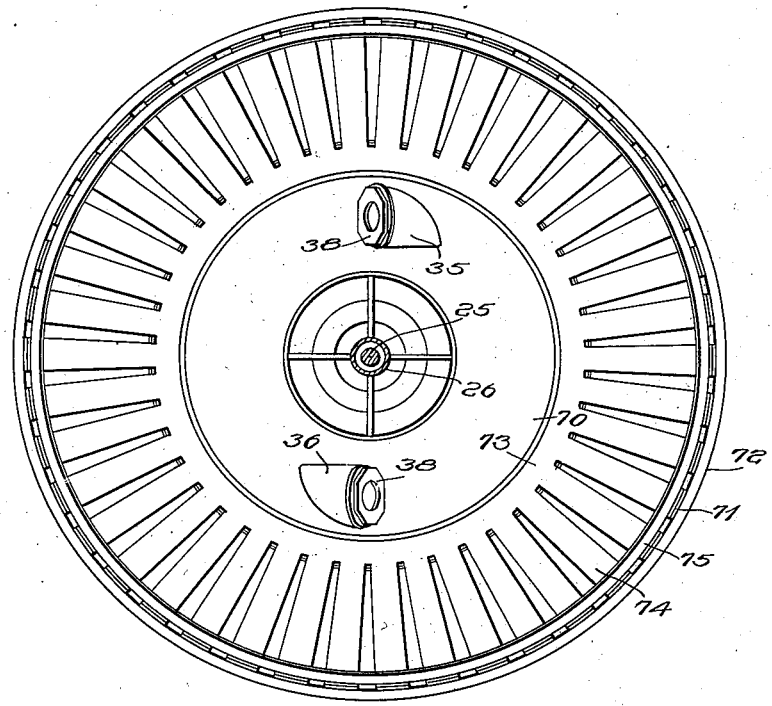
Figure 8 is a top view of a cone of an aerating unit which is of a somewhat different construction from that shown in Figure 4.
Figure 9:
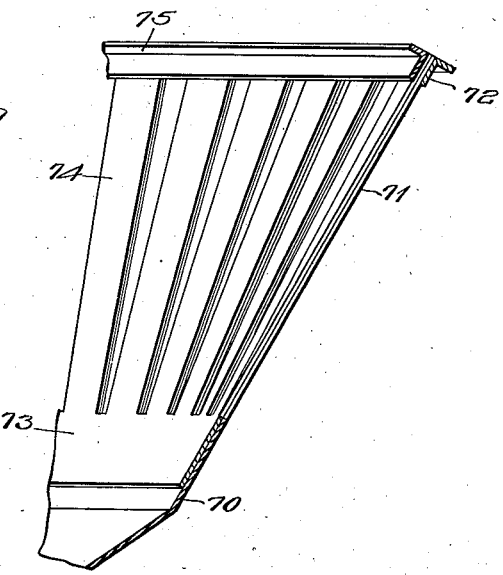
Figure 9 is a fragmentary sectional view taken through the cone shown in Figure 8.

In Figures 8 and 9 there is shown an alternate arrangement for providing for adjustment of the slots in the mixing cone. This mixing cone comprises essentially a pair of mating cones, the outer one of which is stationary and the inner one of which is movable. The outer stationary cone is indicated at 70 and has, formed integrally therewith, a number of strips 71 secured together at their outer ends by a circular rim 72 and defining a number of slots. The inner movable cone is indicated at 73 and likewise comprises a number of strips 74 secured together at their outer ends by a rim 75. The number and size of the slots in the inner cone is exactly the same as in the outer cone. By shifting the position of the inner cone the size of the effective opening of the respective slots is changed. The inner cone may be shifted within the outer cone by the means shown in connection with the apparatus previously described.

While I have herein shown and described a preferred form of my invention it is to be understood that the invention is not limited to the precise arrangement herein shown and described, the same being merely illustrative of the general principles of the invention. What I consider new and desire to secure by Letters Patent is:

1. In an activated sludge process aeration tank, an aerating device comprising a mixing cone, a downflow tube, a circulating pump located between said mixing cone and said downflow tube and drawing surface liquor through the mixing cone and forcing it downwardly into the downflow tube, and means for subdividing the fluid flowing into the cone to constitute a number of separate and independent streams each of which has a large surface area exposed to the air.

2. In an activated sludge process aeration tank, an aerating device comprising a mixing cone, a downflow tube, a circulating pump located between said mixing cone and said downflow tube and drawing surface liquor through the mixing cone and forcing it downwardly into the downflow tube, and means for subdividing the inlet flow into the mixing cone into a plurality of separate and independent streams exposed to the air, said last means including means for adjusting the ratio of volume of flow to the exposed surface area.

3. In an aerating device, the combination of a mixing cone receiving surface liquor, means for subdividing the inlet flow into the mixing cone into a plurality of streams exposed to the air, a downflow tube, and a circulating pump forcing liquor from the cone through said downflow tube.

4. A system for treating sewage by the activated sludge process including an aerating tank divided in a series of stages through which the sewage passes, each of said stages comprising a circulator and mixing cone and means for short circuiting a portion of the sewage being treated, from the lower zone of one stage to the mixing cone of the following stage.

5. A system for treating sewage by the activated sludge process including an aerating tank divided in a series of stages through which the sewage passes, each of said stages comprising a circulator and mixing cone and means for returning sludge from the lower zone of one stage to the mixing cone of the preceding stage.

6. A system for treating sewage by the activated sludge process including an aerating section formed by a series of stages, each stage having an aerating device comprising in combination a central tubular section and an impeller, said central tubular section having an inlet to feed surface liquid to said impeller and means for returning sludge from the lower zone of the preceding stage to said central tubular section.

7. A system for treating sewage by the activated sludge process including an aerating section formed by a series of stages, each stage having an aerating device comprising in combination a central tubular section, an impeller and means for returning sludge from the lower zone of the preceding stage to said central tubular section.

8. In an activated sludge sewage treating system, the method of transferring sewage from the bottom of one stage to the top of a preceding stage, which comprises causing a downward flow of surface liquor and by said flow creating and maintaining a difference in hydrostatic head between the bottom of the stage from which the sewage is to be transferred and the top of the stage to which it is to be transferred, and transferring the liquid by the difference in the hydrostatic head.

9. The method of increasing the area of the surface of liquid exposed to the atmosphere in a sewage disposal tank, which comprises creating a rapid downward flow of liquid from the top surface to produce a depression in the surface of the liquid, and breaking the liquid that flows into the depression into a number of narrow streams, the sides of which are exposed to atmosphere.

10. The method of treating sewage, which comprises exposing the surface of the liquid to the atmosphere, creating a rapid downward flow of liquid from the top surface to produce a depression in the surface of the liquid, creating a flow of liquid from the lower zone of the liquid into the depressed portion by the difference in hydrostatic head, and thoroughly aerating the liquid that flows into the depressed portion.

11. The method of treating liquor in an aeration tank, which comprises setting up in a plurality of places within the tank a local comparatively rapid vertical circulation of the liquor by removing the surface liquor and depositing it in its aerated condition at the bottom zone in the tank, at the same time imparting a comparatively slow longitudinal drift from one end of the tank to the other, and varying the exposed surface area of the liquor being removed from the surface of said tank in accordance with the amount of aeration desired.

12. The method of treating liquor in an aeration tank, which comprises setting up in a plurality of places within the tank a local comparatively rapid vertical circulation of the liquor by removing the surface liquor and depositing it in its aerated condition directly at the bottom zone and at the same time imparting a comparatively slow longitudinal drift from one end of the tank to the other, and setting up a cross flow from the bottom zone of one of the local circulating regions to the top zone of the preceding local circulating region.

13. The method of treating liquor in an aeration tank, which comprises setting up in a plurality of places within the tank, a local comparatively rapid vertical circulation of the liquor by removing the surface liquor, aerating it, and depositing it at the bottom zone and at the same time imparting a comparatively slow longitudinal drift from one end of the tank to the other, setting up a cross flow from the bottom zone of one of the local circulating regions to the top zone of the preceding local circulating region and another and confined cross flow from the bottom of one local circulating region to the top zone of the following local circulating region.

14. The method of aerating liquid in a tank, which comprises exposing the surface liquid to air, creating a flow of surface liquid in the form of a plurality of thin sheets moving towards a common center from all directions whereby the liquid entraps air as it approaches the common center, and constantly withdrawing liquid from the center.

15. A system for treating sewage by the activated sludge process including an aeration section comprising a plurality of stages, each stage including aerating means adjacent the top surface of the liquor undergoing treatment, and means for transferring sludge from the bottom of the section at each stage to the aerating means of the preceding stage and to the aerating means of the following stage.

16. In combination, a sewage treating tank, means for creating a circulation of liquor in the tank by constantly draining off the surface liquor and depositing it at the bottom of the tank and then moving it from the bottom upwardly through the liquor to the surface, another such means similar to the first named means and spaced therefrom for creating a similar circulation, and means for creating a cross circulation from the bottom of the second named means to the top of the first named means and from the bottom of said first named means to the top of said second named means.

17. Liquid aerating means comprising a tank for receiving the liquid to be aerated, means for creating a downward flow of the surface liquid, and means for breaking the flowing liquid into a number of individual streams with their sides exposed to the atmosphere.

18. Liquid treating means comprising a plurality of aerating units each adjacent the top surface of the liquid being treated, said aerating units including means creating a hydrostatic difference in liquid levels, and means affected by the hydrostatic difference in liquid levels for transferring liquid to the top of one of said units from the bottom of the two adjacent units.

19. Liquid treating means comprising a plurality of aerating units each adjacent the top surface of the liquid being treated, and means for transferring liquid from adjacent the bottom of one of said units to the top of the two adjacent units and transferring liquid to the top of one of said units from the bottom of the two adjacent units, said means comprising conduits extending from the bottom of one unit to the tops of the adjacent units and conduits extending to the top of one unit from the bottoms of adjacent units.

20. Sewage treating means comprising a tank for receiving the sewage, a downflow tube extending from adjacent the top surface of the treated sewage to adjacent the bottom of the tank, means for transferring the surface liquid through said tube, and baffle means adjacent the outlet of the tube for distributing the outflow from the tube.

21. A mixing cone comprising a plurality of strips pivotally mounted at one end in spaced relationship and extending in frustro-conical formation, said strips being pivotally connected together at their other ends by a series of links, and means for shifting the said other ends of the strips whereby the size of the slots between strips is varied.

22. A mixing cone comprising a plurality of strips pivotally mounted at one end in spaced relationship and extending in frustro-conical formation, said strips being pivotally connected together at their other ends by a series of links, and means for shifting the said other ends of the strips whereby the size of the slots between strips is varied, said mixing cone being disposed in a body of liquid, and means for creating a flow of liquid through said slots into and through the mixing cone.

23. A mixing cone comprising a pair of mating frustro-conical sections one within the other, said sections having similarly disposed slots therein, said sections being shiftable with respect to one another to vary the effective size of the openings.

24. Digesting apparatus including a plurality of aerating units and means for creating a slow movement of liquor through the successive units; each aerating unit comprising a down flow tube, means for creating a region of reduced hydrostatic pressure adjacent the surface of the liquor and causing the surface liquor to move from all directions towards said reduced pressure region and into the down flow tube, and means for increasing the air exposed surface area of the liquor as it flows towards the tube and for trapping air with the liquor that flows through the tube, each tube discharging adjacent the bottom of its unit; and means for transferring material from the bottom of one unit to the top of another unit comprising a pipe line extending from the bottom of one unit to the region of reduced hydrostatic pressure of another unit.

25. Digesting apparatus including a plurality of aerating units and means for creating a slot movement of liquor through the successive units; each aerating unit comprising a down flow tube, means for creating a region of reduced hydrostatic pressure adjacent the surface of the liquor and causing the surface liquor to move from all directions towards said reduced pressure region and into the down flow tube, and means for increasing the air exposed surface area of the liquor as it flows towards the tube and for trapping air with the liquor that flows through the tube, each tube discharging adjacent the bottom of its unit; means for transferring liquor from adjacent the bottom of one unit to the top of a succeeding unit and to the top of a preceding unit, said last means comprising pipe lines having inlets adjacent the bottom of said one unit and outlets in the region of reduced hydrostatic pressure at succeeding and preceding units whereby liquor flows through the pipe lines from the bottom of said one unit by reason of the reduced hydrostatic pressure.

26. In a sludge aeration tank, means producing a flow of surface and sub-surface liquid, means dividing said flowing liquid into a large number of comparatively thin sheets of moving liquid, the sides of each moving sheet being exposed to atmosphere to permit aeration, and conduit means conveying and discharging said aerated liquid adjacent the bottom of the tank.

27. In a sludge aeration tank, means producing a flow of surface and sub-surface liquid, conical means comprising a plurality of slats defining a plurality of slots dividing said flowing liquid into a large number of comparatively thin sheets of moving liquid flowing toward a common center, the sides of each moving sheet being exposed to atmosphere to permit aeration, and conduit means conveying and discharging said aerated liquid adjacent the bottom of the tank.

28. In a sludge aeration tank, means producing a flow of surface and sub-surface liquid, means comprising a plurality of slats defining a plurality of slots dividing said flowing liquid into a large number of comparatively thin sheets of moving liquid, the sides of each moving sheet being exposed to atmosphere to permit aeration, means for adjusting the sizes of the slots to adjust the thickness of the sheets of moving liquid, and conduit means conveying and discharging said aerated liquid adjacent the bottom of the tank.

29. In an activated sludge process, an aeration tank, an aerating device comprising restricted inlet means for receiving surface liquor from said tank and dividing said liquor into a plurality of individual streams, a downflow tube extending from the lower end of said receiving means to a point adjacent the bottom of the tank to receive said streams, and means for drawing liquor from the lower end of said inlet means and tube downwardly through said tube and discharging said liquor under pressure along the bottom of said tank.

30. In an activated sludge process, an aeration tank, means disposed in said tank and defining a restricted area in the region of the center thereof at the surface of said tank, said means including a mixing cone having an adjustable inlet and a depending downflow tube, means for drawing surface liquor from said tank through the mixing cone into said downflow tube and discharging said liquid under pressure from the lower end thereof, said inlet providing for breaking up of said surface liquor into a plurality of separate streams, and means for varying the cross sectional area of said liquor streams being drawn through said mixing cone into said tube.

31. In an activated sludge process including an aeration tank, the method of aerating the liquor in said tank which comprises drawing the surface liquor in said tank downwardly therethrough, breaking said surface liquor into a plurality of separate and independent streams within a restricted area at the surface of the liquor in said tank, varying the cross sectional area of said streams within said area in accordance with the aeration desired in said tank, and discharging said liquor at the bottom of said tank under pressure to effect cyclic circulation of the liquor in said tank.

32. In an activated sludge process, the method of increasing aeration of liquor in an aeration tank having a vertically extending downflow conduit having one end thereof disposed below the surface of the liquor in the tank and the other end thereof adjacent the bottom of the tank, said first end having a defining inlet opening, which comprises drawing surface liquor from said tank into said conduit through said inlet opening, breaking said liquor into a plurality of separate and independent streams within said opening and prior to its admission to said conduit, and varying the form of said streams in accordance with the aeration desired.

33. The method of aerating liquor in an aeration tank of the class described which comprises drawing surface liquor downwardly through said tank, dividing said flowing liquor into a plurality of independent and spaced streams prior to its downward movement, causing said streams to converge together at a point below the surface of the liquor in said tank during said downward movement, and discharging said liquor under pressure radially along the bottom of said tank.

34. The method of aerating liquor in an aeration tank of the class described which comprises drawing surface liquor downwardly through said tank from a restricted area at the surface of the liquor therein, dividing said flowing liquor into a plurality of independent and spaced streams, varying the cross sectional area of said streams in accordance with the aeration desired, and discharging said liquor under pressure radially along the bottom of said tank.

35. The method of aerating and circulating liquor in an aeration tank of the class described which comprises drawing surface liquor downwardly through said tank from a restricted area at the surface thereof, dividing said liquor as it passes into said area into a plurality of individual streams, varying the cross sectional area of the streams to produce variations in the aeration effected within said tank, recombining said streams below the surface of the liquor in said tank as they leave said restricted area in their downward flow, and discharging said withdrawn liquor under pressure at the bottom of the tank to produce circulation of the liquor in the tank from the bottom to the top thereof.

JOHN B. SPERRY.